United States Patent Office 3,462,396
Patented Aug. 19, 1969

3,462,396
STABILIZATION OF SOLID POLYCAPROLACTAM
Kenneth C. Laughlin, Chester, Va., assignor to Allied Chemical Corporation, New York, N.Y., a corporation of New York
No Drawing. Filed Jan. 24, 1966, Ser. No. 522,373
Int. Cl. C08g 20/38
U.S. Cl. 260—78
7 Claims

ABSTRACT OF THE DISCLOSURE

Polyamides formed by anionic polymerization of caprolactams are stabilized by treating the polyamides in solid particulate form with an aqueous solution of an ammonium salt of an aliphatic monocarboxylic acid having from 2 to 5 carbon atoms in the chain. Polyamides so treated can be heated to their melting points and above and molded or extruded into shaped articles without causing variations in molecular weight.

This invention relates to polycaprolactams. More particularly, the invention relates to solid polymers of e-caprolactam derived from the anionic polymerization of lactams under anhydrous conditions in the presence of an alkali or alkaline earth metal compound.

Many processes have been proposed in the past for the preparation of solid polymers of lactams containing at least 5 carbon atoms in the lactam ring. These processes have been based either upon the hydrolytic polymerization of lactams in the presence of various acetic and basic catalysts, or upon the anionic polymerization of lactams under anhydrous conditions in the presence of an alkali or alkaline earth metal compound as catalytic agent. The anionic polymerization of lactams in the presence of a co-catalyst are generally characterized by employment of low temperatures, i.e., temperature below the softening point of the resulting polymer and also by the rapidity of the polymerization procedure.

Conditions and metal or metal compound catalysts suitable for anionic polymerization are broadly known, including conditions suitable when a co-catalyst is present, e.g. in accordance with U.S. Patents 3,015,652, 3,017,391, 3,017,392, 3,018,273, etc. Generally, the temperatures used for the polymer procedure are in the range from about 100° C. to about 250° C. and the metal or metal or metal compound catalysts are an alkali metal, or alloy thereof, or alkaline earth metal including magnesium, or basically reacting compound of said metal such as hydride, amide, oxide, hydroxide, carbonate, salt of a weak organic acid, metallo organic compound, etc.

The polymerization procedure normally results in a solid polymer product which can be thereafter utilized in the production of shaped articles, for example, molded and extruded articles.

In order to produce shaped articles, it is required that the solid polymer be converted to processable form, for example, in the form of rods, pellets, or chips and thereafter melted to permit handling of the molten polymer in molding or extruding devices. Unfortunately, however, when the solid polymer is melted, new problems are created. More specifically, the molecular weight of the polymer rises or falls unpredictably and erratically on melting of the polymer. As a result, fibers and plastics produced therefrom have undesirable and uncontrollable differences in physical properties due to the altered molecular weight.

An object of the present invention is to stabilize solid polymers of e-caprolactam derived from the anionic polymerization of lactams and which are produced under anhydrous conditions in the presence of an alkali or alkaline earth metal compound, against variation of molecular weight which results from melting the solid polymers.

Other objects and advantages will be apparent from the following detailed description.

It has been postulated, but not yet determined, that the erratic variation of the molecular weight of the molten polymer is caused by the alkali metal catalyst remaining in the polymer after the polymerization procedure.

In accord with this postulation, it would be expected that if the solid polymer product were washed thoroughly with boiling water that the resulting product would have improved melt stability. Experimentation has shown, however, that this is not so. We did discover, however, that, if the solid polymer were washed with an aqueous ammonium salt of an aliphatic acid containing 2 to 5 carbon atoms, that the resulting polymer product possessed molecular stability during re-melting and during the residence period of the molten polymer i.e., the period of time from when the polymer is melted to the time the melted polymer is processed through the shaping devices.

Thus, in a broad aspect, the invention comprises treating solid caprolactam polymers derived from the anionic polymerization of lactams, and which are produced under anhydrous conditions in the presence of an alkali or alkaline earth metal, with an aqueous ammonium salt of a mono-basic acid having 2 to 5 carbons in the chain, in an amount, and for a time, sufficient to impart to the solid polymer the desired degree of molecular stability during melting and residence period of the molten polymer.

In a more specific aspect, solid polymers of e-caprolactam in the form of chips or pellets, are subjected to a washing action with about 5 to 15% aqueous ammonium acetate solution at a ratio of about 5 parts ammonium acetate to 100 parts polymer, at a temperature in the range of about 10 to 85° C. preferably about 20 to 80° C. Although it is not necessary for successful operation of the process, it is, nevertheless, desirable that the treatment be followed by washing the treated polymer with water at a temperature within the range of about 70° to 98° C. to remove the ammonium acetate from the solid polymer.

The operation may be conducted with an aqueous solution of an ammonium salt of a lower aliphatic acid. Examples of suitable salts of lower aliphatic acids include; the ammonium salts of acetic acid, propionic acid, butyric acid and valeric acid. The procedure is preferably conducted with the ammonium salt of acetic because of the ease of operation and the excellent results obtained.

In a representative technique, the solid caprolactam polymer is prepared by conventional procedure, e.g., the procedure described in Belgium Patent No. 623,840 of E. W. Pietrusza, R. Pinter and J. R. Pedersen, wherein the polymerization, under anionic polymerization conditions, of a polymerisable lactam having at least 7 ring members can be rapidly and efficiently conducted in the presence of a class of promoters as described therein. The solid polymer is thereafter formed into chips or pellets and then contacted with a 5 to 15% aqueous salt of a lower aliphatic acid containing two to five carbon atoms, preferably aqueous ammonium acetate in the ratio of five parts ammonium acetate to 100 parts particulate polymer. The mode of contacting the aqueous ammonium salt with the particulate polymer is not critical and may be effected by any of the conventional procedures normally employed for contacting a liquid with a solid.

The quantity of the lower aliphatic acid salt employed in solution may be in the range of about 5 to 15% lower aliphatic acid salt based on the weight of the solution. An amount substantially below about 5% produces inefficient results whereas an amount substantially in excess of about 15% creates problems in purifying the treated polymer products.

The amount of lower aliphatic acid salt employed is about five parts thereof per 100 parts particulate polymer. Temperatures employed during contact of the solid polymer with the aqueous salt solution may vary over the range of about 10° to 85° C., preferably 20° to 80° C.

Optimum results according to a process are obtained when the treated polymer is subjected to a hot water wash which removes the major portion of the aqueous salt of the lower aliphatic acid from the solid polymer. Temperatures employed for the water wash are in the range of about 70° C. to 98° C., preferably 70° to 85° C.

The effectiveness of the process for stabilizing polycaprolactam polymers may be determined by measuring the melt viscositites of the polymer. Melt viscosity measurements for the purpose of the present invention may be made using a Brabender plastograph Model PLV–3 (C. W. Brabender Instruments, Inc., South Hackensack, N.J.) equipped with a stainless steel roller type mixing head Model G88 which masticates the polymer. The mixing head has an 88 cc. mixing chamber capacity containing two intermeshing rollers mounted on a rotatable shaft. The torque generated is measured on a dynamometer. In the test method, a 35 gram sample of polymer to be tested is added to the mixing chamber over a 2 minute period, said sample having been dried at 120° C. for at least 2 hours prior to testing. The mixing chamber is supplied with dry nitrogen which blankets the test specimen, and the chamber is maintained at about 250° C. The viscosity of 60 r.p.m. roller mixing speed is recorded on a chart within about 10 minutes after the polymer is melted. Sensitivity of the device is set at its highest level where 1,000 Brabender units equals 1,000 meter-grams.

Because the geometry of the Brabender mixing chamber is complex, measurement in the conventional units of the rheology, i.e. shear-stress (Dynes-centimeter$^2$), shear rate (per sec.), and poises is not possible. It is thus more convenient to correlate the melt viscosity characteristics in terms of the viscosity reading of the Brabender unit. For purpose of illustration, the polycaproamides prior to treatment according to the present invention will have a Brabender test value of about 430–480 Brabender units.

The following example will illustrate the present invention.

EXAMPLE

Poly-caprolactam was prepared according to the procedure described in Belgium Patent 623,840, using eight parts lithium caprolactam, 80 parts triphenoxy trizane and 1000 parts anhydrous caprolactam. The poly-caprolactam was extruded and pelletized into 0.1 by 0.1 cylindrical rods.

These rods were thereafter separated into six separate portions. The first portion was given no treatment according to the process of the invention and the melt viscosity in Brabender units after ten minutes at 250° C. was determined to be 120 as contrasted to the initial melt viscosity which was between 430 and 480 Brabender units. The second, third and fourth portions were each placed in separate containers and to each of the containers was added two parts 10% aqueous ammonium lactate solution, 10% aqueous ammonium propionate solution and 10% ammonium butyrate solution respectively to one part polymer pellets each at a temperature of about 20° C. The polymer pellets and the solutions remained in the container for about 30 minutes at this temperature with slight agitation being given to the contents. The polymer pellets were thereafter removed from the containers and subjected to a hot water wash with slight agitation at a temperature of about 98° C. The polymer pellets were then removed from the container and dried by passing an inert gas through the polymer pellets at a temperature of about 98° C.

The fifth portion was subjected to a water wash only i.e., no treatment according to the process of the invention, at a temperature of about 98° C.

The sixth portion was subjected to an aqueous ammonium acetate wash as above described, however, no water wash following the ammonium salt wash was employed. The results of the above procedure are indicated below:

| Portion No. | Acid used | Melt viscosity in Brabender units after ten minutes at 250° C. |
|---|---|---|
| 1 | Control polymer "as is" | 120 |
| 2 | Ammonium acetate followed by hot water wash. | 340 |
| 3 | Ammonium propionate followed by hot water wash. | 310 |
| 4 | Ammonium butyrate followed by hot water wash. | 280 |
| 5 | Water wash only | 180 |
| 6 | Ammonium acetate, no wash employed | 320 |

By examination of the above data, it can be seen that a significant and marked improvement resulted in the control of variation of molecular weight which results from melting the solid polymers of e-caprolactam derived from the anionic polymerization of lactams.

Although certain preferred embodiments of the invention have been disclosed for purpose of illustration, it will be evident that various changes and modifications may be made therein without departing from the scope and spirit of the invention.

I claim:
1. A process for stabilizing solid caprolactam polymers formed by anionic polymerization of lactams, which process comprises contacting said caprolactam polymers in particulate form with an aqueous liquid solution of an ammonium salt of an aliphatic monocarboxylic acid having 2 to 5 carbons in the chain.

2. A process according to claim 1 wherein the concentration of the aqueous solution is between about 5% and about 15% aliphatic acid salt based on the weight of the solution; the amount of aliphatic acid salt employed is about five parts aliphatic acid salt per about 100 parts particulate polymer; and wherein the temperatures employed during contact of the solid polymer with the aqueous solution is within the range of about 10° to 85° C.

3. A process according to claim 2 wherein the aqueous ammonium salt of the aliphatic acid is ammonium acetate.

4. A process according to claim 2 wherein the aqueous ammonium salt of the alphatic acid is ammonium butyrate.

5. A process according to claim 2 wherein the aqueous ammonium salt of the aliphatic acid is ammonimum propionate.

6. A process according to claim 2 wherein the aqueous ammonium salt of the aliphatic acid is ammonium valerate.

7. A process according to claim 2 wherein the treated caprolactam polymer is subjected to a hot water wash at a temperature in the range of about 70° C. to 98° C.

References Cited

UNITED STATES PATENTS 3,017,391   1/1962   Mottus et al. _____ 260—78
3,086,962   4/1963   Mottus et al. _____ 260—78

FOREIGN PATENTS 896,606   5/1962   Great Britain.
944,308   12/1963   Great Britain.

HAROLD D. ANDERSON, Primary Examiner

U.S. Cl. X.R.

260—96